March 3, 1970 L. A. WILKINSON 3,498,699
REFRACTOR
Filed June 13, 1967 5 Sheets-Sheet 1

FIG. 1.

INVENTOR
LEONARD A. WILKINSON
BY
Amster & Rothstein
ATTORNEYS

March 3, 1970  L. A. WILKINSON  3,498,699
REFRACTOR
Filed June 13, 1967  5 Sheets-Sheet 2

FIG. 2.

INVENTOR
LEONARD A. WILKINSON
BY
ATTORNEYS

March 3, 1970 L. A. WILKINSON 3,498,699
REFRACTOR

Filed June 13, 1967 5 Sheets-Sheet 3

FIG. 3.

INVENTOR
LEONARD A. WILKINSON
BY
ATTORNEYS

March 3, 1970  L. A. WILKINSON  3,498,699
REFRACTOR

Filed June 13, 1967

INVENTOR
LEONARD A. WILKINSON
BY
Amster & Rothstein
ATTORNEYS

March 3, 1970

L. A. WILKINSON 3,498,699

REFRACTOR

Filed June 13, 1967

INVENTOR
LEONARD A. WILKINSON
BY
Amster & Rothstein
ATTORNEYS 3,498,699
REFRACTOR
Leonard A. Wilkinson, Snyder, Erie, N.Y., assignor to American Optical Corporation, a corporation of Delaware
Filed June 13, 1967, Ser. No. 645,681
Int. Cl. A61b 3/02
U.S. Cl. 351—29                                    9 Claims

ABSTRACT OF THE DISCLOSURE

A refractor having a pair of batteries. Each battery includes a sphere lens assembly and a cylinder lens assembly, each assembly including a set of variously powered lenses which can be successively rotated into alignment with a viewing tube in each battery. The axis of the cylinder lens in the viewing tube is rotated by an external control knob. A cross cylinder carried by a turret can be swung in front of the viewing tube to enable the practitioner to perform the Jackson cross cylinder test. A gear train brings the flip axis of the cross cylinder into coincidence with the preset cylinder axis. As the practitioner resets the cylinder axis, the gear train shifts the cross cylinder to retain it in coincidence with the cylinder axis. A rotatable indexed loupe for the cross cylinder enables the practitioner to perform the power test, as well.

---

The present invention relates to refractors and, more specifically, to a cross cylinder arrangement for a refractor.

Refractors are well known ophthalmic instruments used for determining the proper lens values necessary to correct the defective vision of a patient. The refractor typically includes a right hand battery and a left hand battery, each for enabling the practitioner to place various corrective lenses in alignment with one of the patient's eyes. Each of the batteries is alike and each includes a sphere lens assembly and a cylinder lens assembly. Each such assembly includes one or more discs, and each disc carries a set of variously-powered lenses. The practitioner may rotate one or more sphere lenses and one or more cylinder lenses into alignment with a viewing tube in each battery. The patient's eyes are, of course, in viewing alignment with the two viewing tubes in the batteries of the refractor.

A loupe-mounted cross cylinder for performing the Jackson cross cylinder test, enabling a check of the cylinder axis and power, is a known accessory which was carried by prior refractors. The cross cylinder is a lens consisting of equal power plus and minus cylinders with their axes 90° apart and is mounted in its loupe for rotation about a flip axis midway between the plus and minus axes. When the cross cylinder is flipped, the plus and minus axes change places. The cross cylinder is used by lining up its flip axis with the previously determined astigmatism correcting cylinder axis. When the cross cylinder is flipped, if each of its positions produces an equal blur, the astigmatism correcting cylinder axis is proper. If one position is clearer than the other, the astigmatism correcting cylinder axis is rotated toward the cross cylinder axis which makes vision better. The process is continued until an equal blurring is achieved when the cross cylinder is flipped. Then, to check cylinder power, the cross cylinder is rotated 45°, thereby bringing one of its axes parallel with the correcting cylinder axis. The cross cylinder is again flipped, and equal impairment of vision indicates a correct strength. When the astigmatism correcting cylinder is negative and if vision is better with the minus axis of the cross cylinder parallel to the correcting cylinder axis, the power should be increased, and vice versa. These steps are repeated until equal impairment is observed in each position.

The benefits of the Jackson cross cylinder test, though recognized by those skilled in the art, are sometimes difficult to obtain. The practitioner encounters numerous inconveniences attempting to use such cross cylinders supported on prior refractors. Envision for a moment the laborious expenditure of time and effort required by the practitioner in operating the cross cylinder and, more specifically, in synchronizing the flip axis of the cross cylinder with the preset cylinder axis. After the astigmatism correcting axis was determined, the practitioner had to read the axis from a scale and rotate the cross cylinder until its flip axis was parallel with the cylinder axis. This point was determined by also reading the flip axis of the cross cylinder from a scale and ensuring that both readings were the same. Unless each scale was read very carefully, errors introduced by the practitioner resulted. Moreover, the practitioner's side of the refractor is conventionally crowded with myriad knobs, lenses, controls, accessories and attachments, so as to impair a clear view of any scale.

But bringing the cylinder axis and the cross cylinder into initial alignment was only a preliminary step. Often during the flipping of the cross cylinder, the necessary manipulation of its loupe caused accidental rotation of the cross cylinder, which might or might not be detected. For this reason, the careful practitioner would often check the settings of the cylinder axis with the flip axis of the cross cylinder during the Jackson test to assure himself of continual proper alignment. As the Jackson test progressed, the flipping of the cross cylinder usually indicated that a correction should be made to the cylinder axis. Each time such axial modification was made, the flip axis of the cross cylinder again had to be read, the cylinder axis had to be read, and the two accurately paralleled. This procedure was carried out numerous times, perhaps up to a dozen times, for each eye.

It will be evident that the foregoing difficulties in administering the Jackson cross cylinder test did not encourage its use by the practitioner, even where such an accessory was mounted on the refractor. These difficulties tended to make proper use of the cross cylinder cumbersome and tedious and lent itself to unnecessarily slow and inaccurate refractions.

It is the primary object of the present invention to provide a cross cylinder arrangement for a refractor which eliminates the above-described disadvantages.

It is a further object of the present invention to provide a cross cylinder arrangement for a refractor of the character described which both initially parallels the cross cylinder axis to the preset cylinder axis and thereafter maintains the cross cylinder axis in coincidence with the cylinder axis through the usual numerous corrections to the cylinder axis.

It is another object of the present invention to provide a cross cylinder arrangement for a refractor of the character described wherein a control knob on the refractor permits rotation of the cylinder axis and the arrangement includes a two-branched gear train mechanically linking the control knob to the cylinder lenses in the viewing tube and simultaneously linking the control knob to the cross cylinder loupe.

It is another object of the present invention to provide a cross cylinder arrangement for a refractor of the character described wherein the cross cylinder loupe is mounted on a turret so that the cross cylinder may be swung out of and into alignment with the viewing tube at the discretion of the practitioner, while at the same time the gear train continuously maintains the aforesaid mechanical connection between the cross cylinder loupe and the cylinder axis control knob.

It is still another object of the present invention to provide a cross cylinder arrangement for a refractor of the character described wherein the cross cylinder loupe, while linked to the control knob, is mounted for limited rotation through an arc of 45° to enable the practitioner to perform both an axis check and a power check with the cross cylinder.

The present invention contemplates, in a refractor having a pair of batteries, each including a sphere lens assembly, a cylinder lens assembly, a viewing tube, the lenses being rotatable into viewing alignment with the viewing tube, means including a control knob for rotating the cylinder axis, and a cross cylinder, the improvement comprising means responsive to the cylinder axis rotating means for initially bringing the cross cylinder axis into coincidence with the preset cylinder axis and thereafter maintaining such coincidence through subsequent angular corrections of the cylinder axis. More specifically, the cylinder axis responsive means constitutes an auxiliary gear train which branches from a main gear train mechanically linking the control knob to the cylinder lenses. The auxiliary gear train is driven from the control knob and includes a sun gear. The cross cylinder is mounted in a loupe, and the loupe is carried for rotation on a turret between positions in which the cross cylinder is in alignment with the viewing tube and in which the cross cylinder is clear of the tube. The loupe has a gear coaxial with and slidably secured to it, and the loupe gear is a satellite of the sun gear. Accordingly, as the turret swings to bring the cross cylinder into viewing alignment with the viewing tube, the loupe gear walks about the sun gear so that when the cross cylinder is in alignment with the viewing tube, the cross cylinder flip axis is parallel with the cylinder axis. Thereafter, rotation of the control knob to correct the cylinder axis through the main gear train simultaneously drives the loupe gear to correct the cross cylinder flip axis to the same angular extent. The cross cylinder loupe is slidably indexed with respect to the loupe gear so that it can be rotated through a limited arc to perform both the axis check and the power check.

The above brief description, as well as further objects, features, and advantages of the present invention, will be more fully appreciated by reference to the following detailed description of a presently preferred, but nonetheless illustrative embodiment in accordance with the present invention, when taken in conjunction with the accompanying drawings, wherein:

THE REFRACTOR

Figure 1:
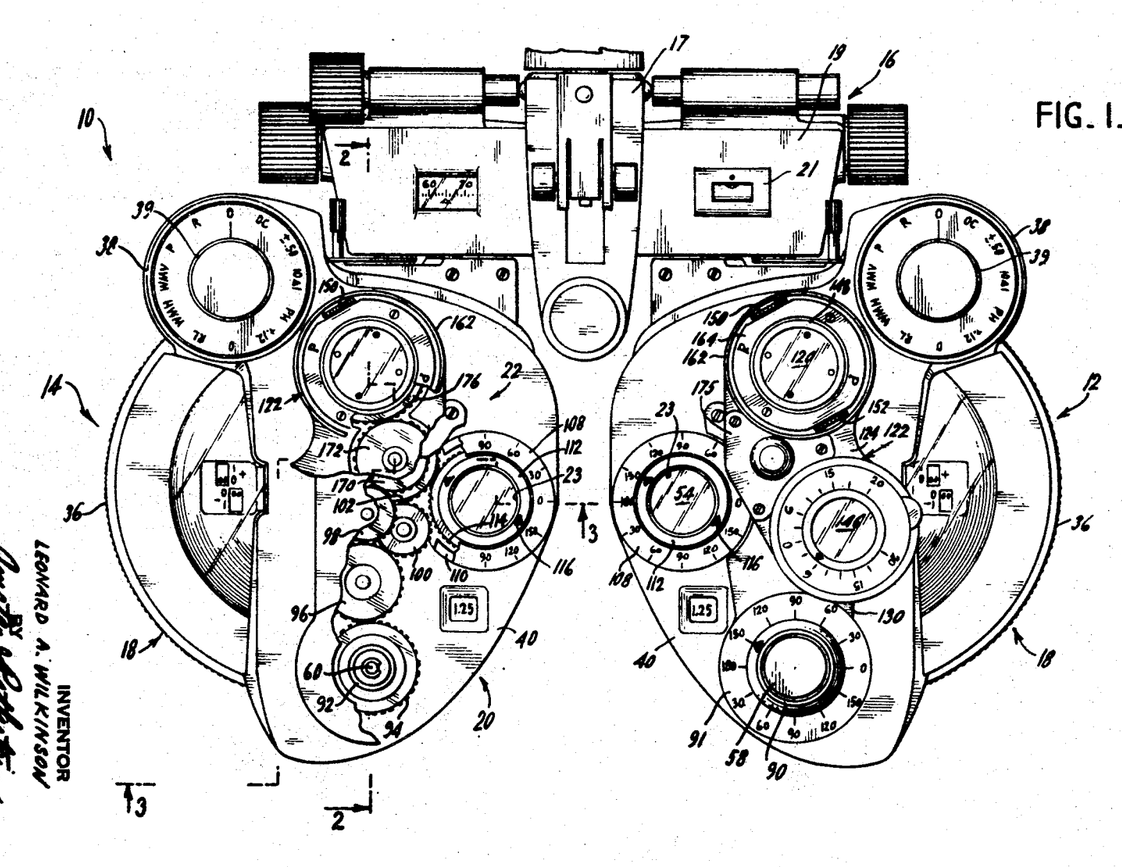
FIG. 1 is a front view of the refractor of the present invention, the same being taken from the practitioner's side of the instrument and showing the left eye battery in elevation, the right eye battery partially in elevation and partially broken away to reveal internal gearing, and a support interconnectin gthe batteries.

The refractor of the present invention is designated by the reference numeral 10 and its components are best seen in FIG. 1. The refractor includes a left eye battery 12 and a right eye battery 14, these batteries being essentially identical. Only the components of a single battery will be discussed in detail. FIG. 1 shows the refractor 10 from the practitioner's side, and this side will be referred to as the front side of the instrument. The other side of the instrument is, of course, the patient's side and will be referred to as the rear side of the instrument. The batteries 12, 14 are retained side by side by a support 16. This support is disclosed and claimed in United States Patent No. 2,923,200, issued Feb. 2, 1960, for "Eye Testing Instruments." The support permits desired manipulation of the batteries with respect to the patient's eyes and includes, generally, a yoke 17, a support bridge 19 and a level 21.

The major component parts of each battery (see FIGS. 2 and 3) include a sphere lens assembly 18, a cylinder lens assembly 20 and a cross cylinder arrangement 22. Each of the batteries further includes a viewing tube 23. Each of these component parts will be hereinafter discussed in detail. The patient positions his head to the rear of the instrument so that each of his eyes is in alignment with a different one of the viewing tubes.

THE SPHERE LENS ASSEMBLY

The sphere lens assembly 18 (FIGS. 2 and 3) includes a sphere lens housing 24 in which a pair of lens discs 26, 28 are coaxially rotatably mounted. The housing 24 includes a viewing aperture 27 which defines the rear end of the viewing tube 23. The forward-most disc 26 carries a set of weak sphere lenses and the rearward-most disc 28 carries a set of strong sphere lenses. Each of the discs 26, 28 also has an empty aperture respectively 30, 32 and the lenses of these discs as well as the blank apertures can be selectively and successively rotated into viewing alignment with the viewing tube. The sphere lens assembly 18 further includes an auxiliary lens disc 34 coaxial with the sphere lens discs 26, 28. The auxiliary disc 34 is also rotatable so that its lenses come into viewing alignment with the viewing tube 23. The selection of the weak sphere lens, the strong sphere lens and the auxiliary lens is controlled, respectively, by rotation of the sphere lens disc 26 by direct contact with its exposed knurled edge 36, by rotation of a strong sphere lens control knob 38 and by rotation of an auxiliary lens control knob 39. The sphere lens assembly is disclosed and claimed in United States Patent No. 2,995,065, issued Aug. 8, 1961, for "Refractors."

THE CYLINDER LENS ASSEMBLY

The cylinder lens assembly 20 (FIGS. 2 and 3) includes a housing 40 which is fixed to the lens housing 24, and the housing carries a guard 42 (FIG. 3) which defines the front end of the viewing tube 23. The cylinder lens assembly further includes a pair of cylinder lens discs, a forward-most disc 44 which constitutes the weak cylinder lens disc and a rearward-most disc 46 which constitutes the strong cylinder lens disc. The strong cylinder lens disc 46 is shown in elevation in FIG. 5. Each of the cylinder lens discs is similar in configuration and the discs are coaxially rotatably mounted on the housing 40. To end this, a collar 48 is fixed to the housing 40 and the weak cylinder lens disc 44 is journaled on a projecting portion of this collar and the strong cylinder lens disc is journaled for rotation on a headed stud 50 which is coaxially mounted within the collar 48.

The strong and weak cylinder lens discs carry sets of strong and weak cylinder lenses of various powers, respectively 52, 54. The lenses of the respective discs are mounted circumferentially on the discs so that these lenses will upon rotation of the discs come into alignment with the viewing tube.

The strong and weak cylinder lens discs are engaged for rotation by Geneva intermittent drive gear means 56 (FIGS. 2 and 5) which in turn is driven by hand-operable drive means, including a cylinder power control knob 58. More specifically, the control knob 58 is fixed to a drive shaft 60 which is rotatable within a post 62 secured to the housing 40. The drive shaft 60 is fast to a drive gear 64 which meshes with an idler gear 66 rotatably mounted on the housing 40. The idler 66 is coaxial with and secured to a flat-plate driver 68. The driver carrier a plurality of spaced drive pins 70, typically five in number. One of the drive pins 70a is longer than the remainder.

Each of the lens discs 44, 46 has five radially-oriented slots, the strong cylinder lens disc including the slots 72 and the weak cylinder lens disc including the slots 74. As the driver 68 is rotated by rotation of the knob 58, each of its drive pins successively engages the slots 74 in the weak cylinder lens disc and advances the cylinder lenses 54 of this disc one after another into alignment with the viewing tube 23. The longer drive pin 70a, upon each rotation of the driver, engages in addition one of the slots 72 of the strong cylinder lens disc 46 so that upon the advancement of the weak cylinder lens disc through one rotation, the strong cylinder lens 46 is advanced to its next lens position. Index mechanisms 76, 78 engage detents 80, 82, respectively, in the driver 68 and in the strong cylinder lens disc 46 in order to insure alignment of the various lenses with the viewing tube.

Figure 2:
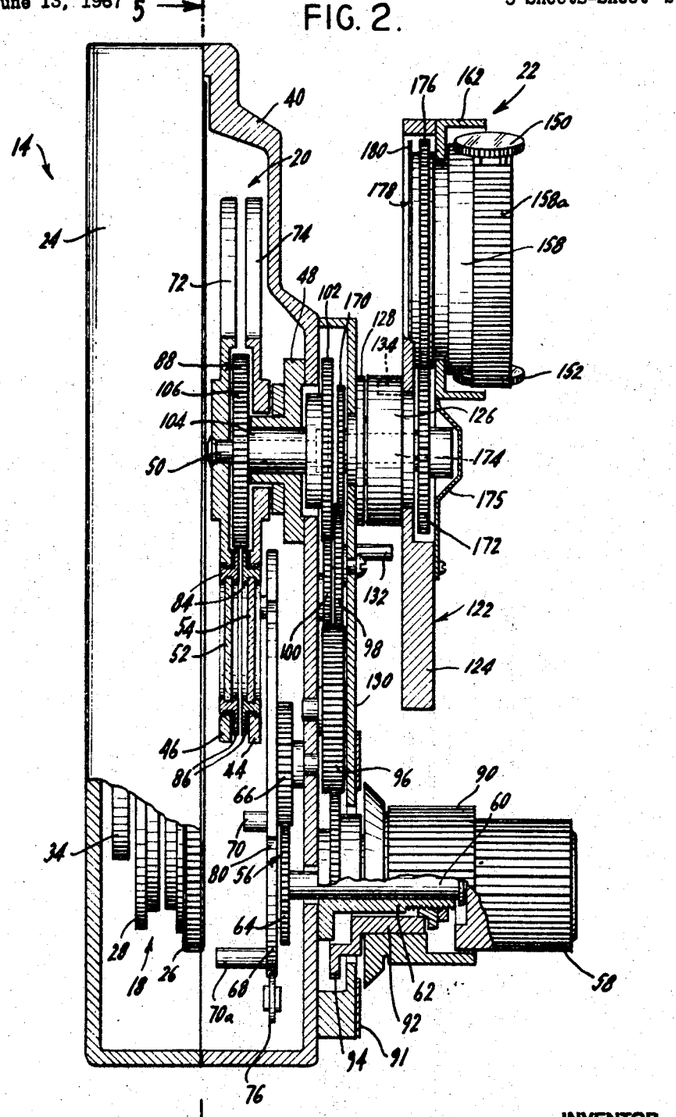
FIG. 2 is a cross sectional view of the right eye battery taken substantially along the line 2—2 of FIG. 1, illustrating the right eye sphere lens assembly in elevation and the cylinder lens assembly and the cross cylinder arrangement in cross section.
Figure 3:
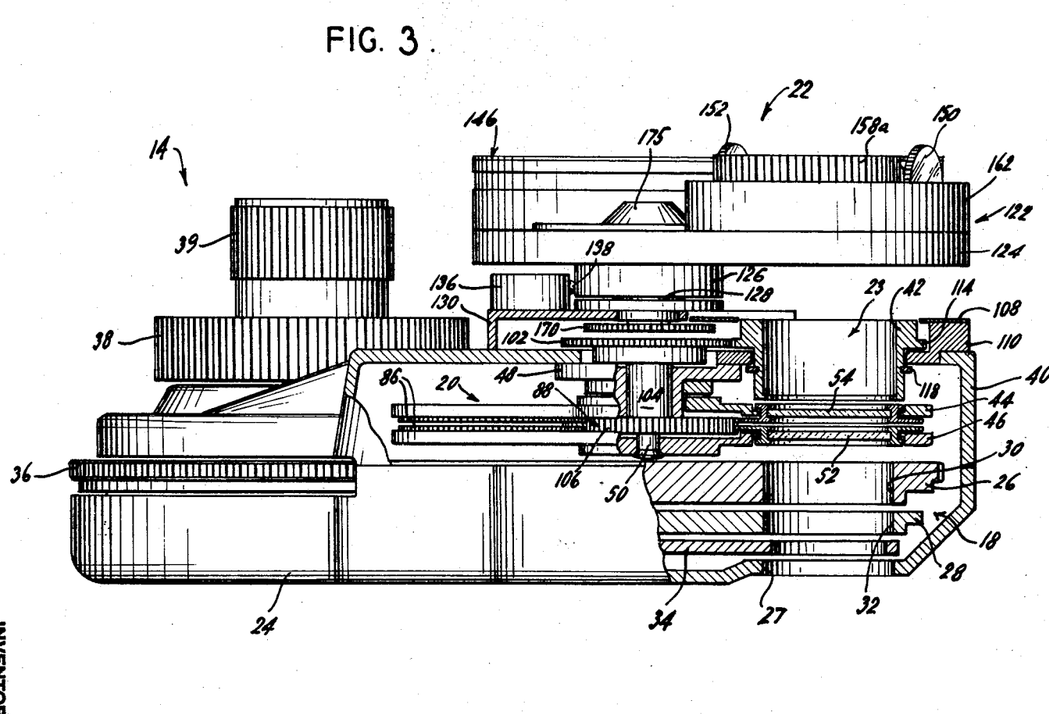
FIG. 3 is a sectional view of the right eye battery taken substantially along the line 3—3 of FIG. 1, illustrating the right eye sphere assembly partially in section, the cylinder lens assembly in section and the cross cylinder arrangement partially in section and partially in elevation.
Figure 5:
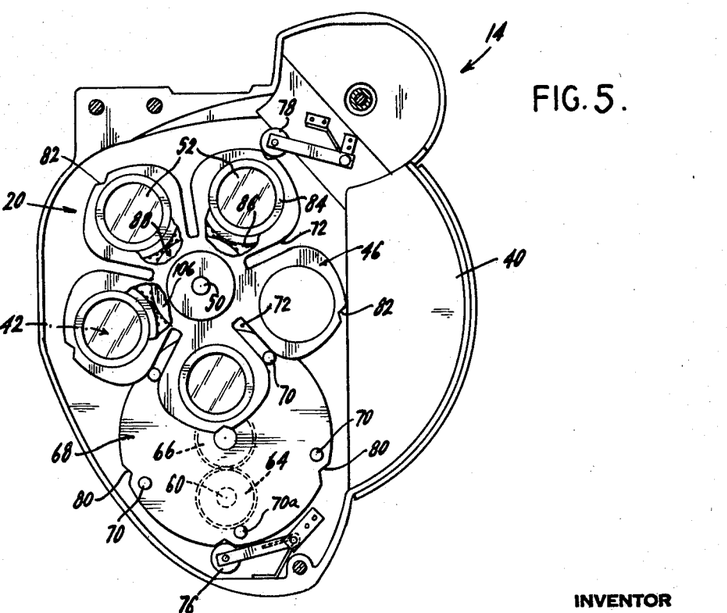
FIG. 5 is an elevational view, from the patient's side of the instrument, of the cylinder lens assembly of the right eye battery taken substantially along the line 5—5 of FIG. 2.

The practitioner controls not only the power of the cylinder lenses in alignment with the viewing tube, but also the orientation of the axis of these lenses. For this purpose, each of the cylinder lenses 52, 54 in the discs 44, 46 is rotatably mounted in its disc by a cell 84, all of the cells being similar in construction and each having a ring of gear teeth formed about its rim (FIGS. 2, 3 and 5). The periphery of each cell defines a circumferential groove by which it is slidably rotatably retained in its disc. The interior periphery of each cell defines a groove which captures a single cylinder lens.

A main gear train, generally designated by reference numeral 88, mechanically links the cells and another hand-operable drive means, including a cylinder axis control knob 90. The angular orientation of the knob 90 is read on a scale 91. Specifically, the knob 90 is tubular and is coaxially secured to a sleeve 92 journaled on the post 62 (FIG. 2). A drive gear 94 is formed on the interior end of said sleeve. The drive gear meshes with an idler gear 96 rotatably mounted on the housing 40 and the idler gear meshes with a pair of idler gears, a front idler gear 98 and a rear idler gear 100 (FIGS. 1 and 2). The drive train from the idler gear 98 will be subsequently discussed.

The idler gear 100 is rotatably mounted on the housing and meshes with another idler gear 102 which is coaxial with and secured by a sleeve 104 to a drive gear 106. The gear 106 is situated centrally of and meshes with the teeth 86 of the cells 84 on both discs 44, 46. Cells 84 thus act like planet gears about sun gear 106. The sleeve 104 is journaled in collar 48 (FIG. 2). The rotation of the cylinder axis control knob 90 through the gear train 88 rotates the cylinder lenses which are in alignment with the viewing tube, as well as the remaining cylinder lenses. The cells function as satellites with respect to the drive gear 106 so that when said drive gear is stationary (this being when the control knob 90 is stationary) and the discs 44, 46 are rotated, each lens will assume a like orientation of its axis as it comes into alignment with the viewing tube. The diameters of the cells and the drive gear 106 and the initial orientation of each lens are so chosen that the desired result is achieved, this of course being within the competence of a mechanic skilled in the art.

Visual indication is given of the orientation of the axis of the cylinder lenses in the viewing tube. An axis scale 108 (see FIG. 3) is secured to a wall 110 of the housing and has appropriate index markings thereon. The tubular guard 42 is rotatably journaled on said wall 110 and has a ring of gear teeth 114 thereon which mesh with the idler gear 102. The guard 42 has stamped on its external face a pair of diametrically opposed arrows 116 to indicate the angular orientation of the cylinder axis. A retaining ring 118 keeps the guard 42 in place. Further details of the foregoing cylinder lens assembly will be found in United States Patent No. 2,968,213, issued Jan. 17, 1961 for "Refractor Having Cylindrical Lens Carriers and Drive Means."

THE CROSS CYLINDER ARRANGEMENT

Figures 6, 7, 8, 9, 10, 11, 12:
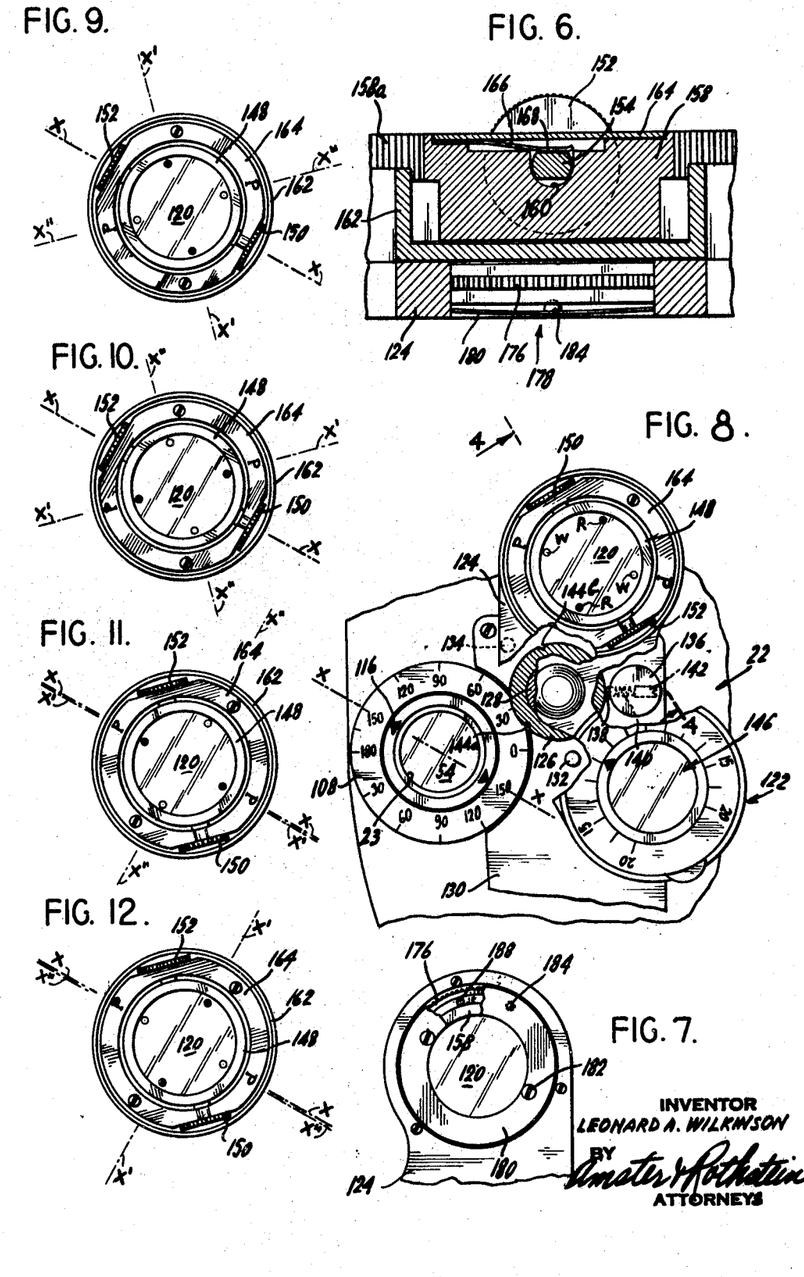
FIG. 6 is an enlarged cross sectional view of the cross cylinder arrangement taken substantially along the line 6—6 of FIG. 4.
FIG. 7 is a rear fragmentary view of the cross cylinder arrangement.
FIG. 8 is a fragmentary partially elevational and partially broken away view of the cross cylinder turret of the left eye battery of FIG. 1.
FIGS. 9 through 12 illustrate the various positions of the cross cylinder in performing an axis check and a power check.

The cross cylinder arrangement 22 includes a cross cylinder 120, a lens consisting of equal power plus and minus cylinders with their axes 90° apart. Typically, such a lens is ±0.25D. The cross cylinder carries two pairs of diametrically opposed dots. One pair of dots R, R lies at the ends of the — (minus) axis and the other pair of dots W, W lies at the ends of the + (plus) axis (FIG. 8). The — axis is indicated by the dot and dash line X'—X' and the + axis is indicated by the dot and dash lines X"—X". The + and — axes are 90° apart. The foregoing axes are seen in FIGS. 8 through 12.

The arrangement 22 further includes a turret 122 for swinging the cross cylinder between a position in alignment with the viewing tube (as seen in FIG. 3) and a position clear of said tube (as seen in FIGS. 1 and 8). The turret 122 includes a turret frame 124 to the undersurface of which is fixed a sleeve 126. The sleeve 126 rotates on a hollow bearing 128 which is fixed to a gear housing 130 on the housing 40. The turret 122 rotates with the sleeve 126 on the housing 130 and the cross cylinder 120 is situated off center on the turret whereby the cross cylinder can be swung into alignment with the viewing tube by rotation of the turret.

Stop means prevents swinging of the turret excessively beyond its two positions. The housing 130 carries an upright stop 132 and the turret frame 124 carries a dependent stop 134 (see FIG. 2). When the turret is rotated in a direction to bring the cross cylinder into alignment (counterclockwise on the left eye battery in FIG. 8), the stop 134 contacts the stop 132 immediately after the cross cylinder has come into alignment with the viewing tube 23 and serves to limit further movement. The housing 130 also carries a cylindrical block 136 and this block contacts the stop 134 when the turret is swung in the opposite direction (see FIG. 8).

Detent means indicates when the cross cylinder 120 is in proper alignment with the viewing tube. For this purpose, the cylindrical block 136 has a bore which extends radially of the sleeve 126 (see FIG. 8). A ball 138 is seated in this bore in the end nearest the sleeve and a small coil spring 140 in said bore urges the ball towards the sleeve. A set screw 142 threads into the other end of the bore to capture the spring 140 in place. The sleeve 126 has a pair of spaced notches 144 formed on its periphery into which the ball 138 is urged, when either of the notches is brought into radial alignment with the ball. When the turret is rotated to swing the sleeve to bring one of the notches 144a into alignment with the ball, the "click" of the ball into the notch is both felt and heard and the cross cylinder 120 is in alignment with the viewing tube.

The turret may additionally carry another test lens, as for example a rotary prism loupe 146. When the ball 138 falls into the other notch 144b, this loupe 146 will be in alignment with the viewing tube (see FIG. 8).

Means mounts the cross cylinder 120 for rotation about an axis lying in the plane of the cross cylinder, midway between the + and − axes. This axis runs between a pair of roll knobs 150, 152 and this axis is the "flip" axis of the cross cylinder. This mounting enables the practitioner to "flip" the cross cylinder, as required in the Jackson test. The cross cylinder 120 is held in a lens ring 148 (see FIG. 4). The pair of roll knobs 150, 152 are fixed by their respective shafts 154, 156 to diametrically opposed locations on the ring. A tubular loupe 158 surrounds the cross cylinder lens 120 and the loupe has a pair of opposed grooves 160 in which the shafts 154, 156 are journaled for rotation. A tubular guard 162 surrounds the loupe 158 and is fixed to the turret frame. The cross cylinder can be flipped by "rolling" the knobs 150, 152. (See dot-and-dash outline of FIG. 4.)

Spring means biases the cross cylinder to either of its flip positions so that it lies in a plane generally parallel to the planes in which the cylinder and sphere lenses lie in their respective discs. Said means includes a retaining ring 164 fixed as by screws 165 to the outward face of the loupe 158. Said ring carries a spring arm 166 (see FIG. 6) which presses against flats 168 formed on the shaft 154 of the roll knob 150, these flats being substantially coplanar with the cross cylinder. The other side of the ring is slightly depressed as at 167 to prevent excessive play of the shaft 156. The spring means tends to retain the cross cylinder 120 in any one of its two flip positions, while still permitting the practitioner to flip said cross cylinder freely from one side to the other.

It should be mentioned that the retaining ring 164 can be easily removed by removal of the screws 165 (FIG. 4) to permit the substitution of a different cross cylinder held in a lens ring, if the practitioner desires. The retaining ring 164 is replaced in the converse manner.

Means responsive to the means for setting the cylinder axis initially sets the cross cylinder flip axis in parallel with the cylinder axis, and thereafter maintains such coincidence during subsequent corrections of the cylinder axis. Said responsive means includes a gear train which mechanically links the gear means 88 with the cross cylinder loupe 158. Said responsive means insures that the axial orientation of the cylinder lenses of the discs 44, 46 in alignment with the viewing tube 23 is paralleled by the axial orientation of the cross cylinder flip axis. It was previously explained that rotation of the cylinder axis control knob 90 would drive the idler gear 96 and the front idler gear 98. The responsive means includes a gear train which branches from the main gear train and which initiates from the front idler gear 98 and meshes with another idler gear 170 which is coaxial with and secured by a shaft 174 to a drive gear 172 within the turret frame 124 (see FIG. 2). The shaft 174 is contained within the sleeve 126 and the bearing 128 and is coaxial with the axis of rotation of the turret 122. A dome cover 175 encloses the end of the shaft 174 and the gear 172.

Figure 4:
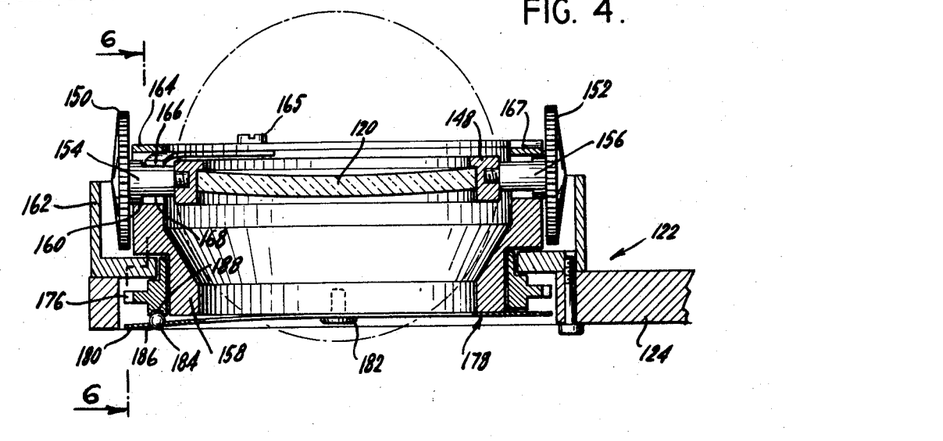
FIG. 4 is an enlarged cross sectional view of the cross cylinder arrangement taken substantially along the line 4—4 of FIG. 8.

The drive gear 172 meshes with a cross cylinder ring gear 176 coaxial with and detachably engaged to the cross cylinder loupe 158 by position-index means, generally 178. The ring gear circumscribes the rear of the loupe (FIGS. 4 and 6).

The gear 172 has a stationary axis of rotation with respect to the battery and may thus be considered a sun gear with respect to its satellite, the cross cylinder ring or planet gear 176. When the turret 122 is rotated to bring the cross cylinder 120 into alignment with the viewing tube, the satellite walks about the sun gear and in doing so rotates to a final position with the flip axis of the cross cylinder parallel to the cylinder axis. The diameters of the various gears and the initial orientation of cross cylinder flip axis are so chosen that this parallelism is achieved, the same being within the competence of one skilled in the art. After the turret has been rotated to bring the cross cylinder into alignment with the viewing tube, subsequent rotation of the control knob 90 to correct the axial orientation of the cylinder lenses will simultaneously similarly to the same extent correct the flip axis of the cross cylinder lens 120.

The position-index means 189, previously referred to, permits limited rotation of the cross cylinder loupe 158 for the purpose of performing the Jackson test. Said index means comprises a flat circular spring 180 overlapping the ring gear and fixed as by screws 182 at opposed points to the inner face of the loupe 158 (see FIGS. 4, 6 and 7). An indexing ball 184 is captured between the spring 180 and the inner face of the cross cylinder gear 176 and the ball is rotatably caught by an aperture 186 in the spring 180. The diameter of the aperture is slightly less than the diameter of the index ball 184. A pair of indents 188, 45° apart, are formed in the inner face of the cross cylinder gear 176. The cross cylinder loupe 158 can be rotated by the practitioner by his grasping the knurled surface 158a (see FIG. 2) of the loupe 158 and between a position in which the ball 184 is biased into one of the indents 188 and a position, 45° distant in which the ball 184 is biased into the other indent 188.

OPERATION

The practitioner utilizes the refractor by first choosing the correct sphere lenses. This is done by rotation of the knurled edge 36 of weak sphere lens disc 26 and by rotation of the strong sphere lens control knob 38, until the proper sphere lenses are brought into alignment with the viewing tube of the battery. The practitioner may also place a desired auxiliary lens into alignment with the viewing tube by rotation of the auxiliary lens control knob 39. The power of the sphere lenses may be read on various dials on the instrument.

The proper cylinder lenses of the cylinder lens discs 44, 46 are brought into alignment with the viewing tube by rotation of the cylinder lens power control knob 58. The practitioner then sets any desired cylinder axis (X—X in FIGS. 8 through 12) by rotation of the cylinder lens axis control knob 90. The cylinder lens cells 84 are driven through the main gear train. The proper axis is determined by retinoscopy. An arrow on the knob 90 points to the protractor scale 91 which surrounds the knob to indicate the angular setting of the cylinder axis and this setting is also indicated by the arrows 116 on the guard 112.

With an initial determination of the proper sphere lenses and cylinder lenses having been made, the turret 122 is rotated until the cross cylinder loupe 158 is in alignment with the viewing tube. The Jackson test is then performed. The loupe is oriented so that the flip axis of the cross cylinder corresponds to the cylinder axis X—X. The axis X′—X′ of the dots R and the axis X″—X″ of the dots W will be 45° to each side of the axis X—X. The flip axis of the cross cylinder should already be in the correct position or, if it is not, it is to be rotated counterclockwise 45° to an index point to achieve the aforesaid alignment.

The axis check test is then performed by flipping the cross cylinder 120 by twirling the knobs 150, 152. The position of the — axis X'—X' is shown in one position in FIG. 9 and in a second, reverse position in FIG. 10. If vision is improved in one position, but made worse in the other position, the cylinder axis X—X is rotated by operation of the control knob 90 toward the position of the cross cylinder axis in which vision is improved.

As the cylinder axis is rotated by the practitioner, the flip axis of the cross cylinder is automatically rotated a corresponding degree and in the same angular direction. This procedure is continued until the optimum axis is ascertained. This point is reached when vision is equally impaired by the cross cylinder being in either of its two positions.

The practitioner then performs a power check. First, the cross cylinder loupe is rotated 45° clockwise. The proper alignment is indicated by an index point. Visual indication that top cylinder loupe is in the correct position is given by the letters P on the retaining ring 164 being in alignment with the cylinder axis X—X. Then the practitioner again flips the cross cylinder between its two positions, as seen in FIGS. 11 and 12. If vision is better with the — axis X'—X' parallel to the cylinder axis X—X (FIG. 11), the power of the cylinder lenses is increased by appropriate rotation of the control knob 58. If vision is better with the — axis X'—X' perpendicular to the cylinder axis (FIG. 12), the power of the cylinder lenses is reduced. If vision is equally impaired by the cross cylinder being in either of its positions, the end point of the test has been reached.

It will be appreciated from the foregoing disclosure that the mechanical linkage between the cross cylinder and the cylinder axis control knob performs the functions of (a) bringing the cross scylinder flip axis into parallel with the preset cylinder axis, as the cross cylinder is swung into alignment with the viewing tube and (b) maintaining the cross cylinder flip axis parallel to the cylinder axis through numerous corrections of the cylinder axis, (c) thereby eliminating the previous necessity of the practitioner manually setting the cross cylinder flip axis every time he made a correction to the cylinder axis.

There is claimed:

1. In combination with a refractor having a pair of batteries, each battery including
  (a) a viewing tube,
  (b) a cylinder lens assembly, the assembly comprising at least one lens-carrying cylinder disc,
  (c) means for rotating the disc so that any selected one of the cylinder lenses comes itno alignment with the viewing tube,
  (d) means for setting the cylinder axis of the cylinder lens in the viewing tube, and
  (e) a cross cylinder assembly mounted on the battery, the cross assembly including
    (i) a cross cylinder,
    (ii) a loupe holding the cross cylinder,
    (iii) a turrent carrying the cross cylinder loupe and mounted for movement between a position in which the cross cylinder is in alignment with the viewing tube and a position in which the cross cylinder is clear of the viewing tube, and
    (iv) means mounting the cross cylinder in the loupe for flipping movement,
      the improvement which comprises means responsive to the cylinder axis setting means for initially paralleling the cross cylinder flip axis with the cylinder axis when the cross cylinder is swung into its position in alignment with the viewing tube and thereafter maintaining the cross cylinder flip axis parallel with the cylinder axis through corrections of the latter said means for setting the cylinder axis including a cylinder axis control knob and a main gear train mechanically linking the knob and the cylinder lens in alignment with the viewing tube, said responsive means including a gear train branching from the main gear train and mechanically linking the cylinder axis control knob to the cross cylinder loupe.

2. The improvement according to claim 1 wherein, in the refractor, there is further included means for mounting the turret for rotation about a stationary axis, means for mounting the cross cylinder in an offset position from said axis and the branch gear train including a sun gear rotatable coaxially with said stationary axis and a satellite gear meshed with the sun gear driving the cross cylinder loupe wherein the cross cylinder loupe is coaxial with the satellite gear and means are provided for mounting the sun and satellite gears for rotation on the turret.

3. The improvement according to claim 1 including position-index means for mounting the cross cylinder loupe for movement between positions 45° apart.

4. The improvement according to claim 2 including position-index means for drivingly engaging the satellite gear to the cross cylinder loupe and for mounting the cross cylinder loupe for movement between positions 45° apart with respect to the satellite gear.

5. The improvement according to claim 4, said position-index means comprising a flat spring fixed to the cross cylinder loupe, a ball and a pair of indents in a face of the satellite gear, the ball being rotatably caged by the spring and being biased by the spring into either of the indents wherein the satellite gear circumscribes the cross cylinder loupe and the flat spring is circular and overlaps the satellite gear.

6. The improvement according to claim 4 including detent means for indicating when the turret has swung to the position wherein the cross cylinder is in alignment with the viewing tube.

7. The improvement according to claim 9 including stop means for preventing the turret from swinging beyond said alignment position.

8. The improvement according to claim 1, said loupe having a pair of opposed grooves and the means mounting the cross cylinder in the loupe for flipping movement comprises a ring securing the cross cylinder, a pair of roll knobs, and a pair of shafts, each shaft fixing a knob to a diametricaly opposed location on the ring, the shafts being journaled in the opposed grooves in the loupe.

9. In combination with a refractor having a pair of batteries, each battery including
  (a) a viewing tube,
  (b) a cylinder lens assembly, the asembly comprising at least one lens-carrying cylinder disc,
  (c) means for rotating the disc so that any selected one of the cylinder lenses comes into alignment with the viewing tube,
  (d) means for setting the cylinder axis of the cylinder lens in the viewing tube, and
  (e) a cross cylinder assembly mounted on the battery, the cross cylinder assembly including
    (i) a cross cylinder,
    (ii) a loupe holding the cross cylinder,
    (iii) a turret having a fixed axis and carrying the cross cylinder loupe and mounted for movement between a position in which the cross cylinder is in alignment with the viewing tube and a position in which the cross cylinder is clear of the viewing tube, and
    (iv) means mounting the cross cylinder in the loupe for flipping movement,
    the improvement which comprises;
      a first and second sun gear rotatably disposed relative to the fixed axis of said turret, said first sun gear (172) being in mesh with a planet gear (176) concetrically disposed relative to said cross cylinder and rotatable therewith, said second sun gear (106) being in mesh with at least one planet gear (86) concentrically disposed relative to a corresponding one said cylinder disc and rotatable therewith, said first and second sun gears being operatively connected through parallel gear trains to a common drive gear (94) connected to a cylinder axis control knob (90) by which said cylinder disc and said cross cylinder may be simultaneously rotated.

References Cited

UNITED STATES PATENTS

| | | | |
|---|---|---|---|
| 1,240,289 | 9/1917 | Woolf | 351—28 |
| 2,322,878 | 6/1943 | Peck et al. | 351—29 |
| 2,949,810 | 8/1960 | Wright | 351—29 |
| 2,968,213 | 1/1961 | Wright et al. | 351—29 |

DAVID SCHONBERG, Primary Examiner

P. A. SACHER, Assistant Examiner

U.S. Cl. X.R.

351—28

UNITED STATES PATENT OFFICE
CERTIFICATE OF CORRECTION

Patent No. 3,498,699                        March 3, 1970

Leonard A. Wilkinson

It is certified that error appears in the above identified patent and that said Letters Patent are hereby corrected as shown below:

Column 10, line 41, "9" should read -- 6 --; line 49, "diametricaly" should read -- diametrically --; line 54, "asembly" should read -- assembly --. Column 11, line 2, "concetrically" should read -- concentrically --.

Signed and sealed this 1st day of December 1970.

(SEAL)
Attest:

Edward M. Fletcher, Jr.                      WILLIAM E. SCHUYLER, JR.
Attesting Officer                                 Commissioner of Patents